United States Patent [19]
Lepine et al.

[11] Patent Number: 5,851,573
[45] Date of Patent: Dec. 22, 1998

[54] PET FOOD COMPOSITION FOR LARGE BREED PUPPIES AND METHOD FOR PROMOTING PROPER SKELETAL GROWTH

[75] Inventors: Allan Lepine, Lewisburg; Gregory A. Reinhart, Dayton, both of Ohio

[73] Assignee: The Iams Company, Dayton, Ohio

[21] Appl. No.: 840,402

[22] Filed: Apr. 29, 1997

[51] Int. Cl.$^6$ .................................. A23K 1/175
[52] U.S. Cl. ........................... 426/74; 426/656; 426/658; 426/615; 426/805
[58] Field of Search .............................. 426/74, 656, 658, 426/615, 805

[56] References Cited

FOREIGN PATENT DOCUMENTS 575021   12/1993   European Pat. Off. .

OTHER PUBLICATIONS

K. Dammrich, "Relationship Between Nutrition and Bone Growth in Large and Giant Dogs", *Am. Inst. Nutrition*, pp. S114–S121 (1991).

S.A. Goedegebuure et al. "Morphological Findings in Young Dogs Chronically Fed a Diet Containing Excess Calcium", *Vet Pathol.*, vol. 23, pp. 594–605 (1986).

H.A.W. Hazewinkel et al, "Influences of Chronic Calcium Excess on the Skeletal Development of Growing Great Danes", *J. Am. Animal Hosp. Assoc.*, vol. 21, pp. 377–391 (1985).

H.A.W. Hazewinkel et al, "Calcium Metabolism in Great Dane Dogs Fed Diets with Various Calcium and Phosphorus Levels", *Am. Inst. Nutrition*, pp. S99–S106 (1991).

R. Nap et al, "Growth and Skeletal Development in Great Dane Pups Fed Different Levels of Protein Intake", *Am. Inst. Nurtition*, pp. S107–S113 (1991).

Parajon et al., Recl. Med. Vet., vol. 172(9/10), pp. 495–509, 1996.

*Primary Examiner*—Chhaya D. Sayala
*Attorney, Agent, or Firm*—Killworth, Gottman, Hagan & Schaeff, L.L.P.

[57] ABSTRACT

A pet food composition is provided for large breed puppies which contains from about 0.75% to 0.95% by weight calcium and from about 0.62% to 0.72% by weight phosphorous. The composition further includes a source of protein, a source of fiber, and a source of fat. The pet food composition is fed to large breed puppies to provide optimum skeletal growth and reduce the incidence of skeletal abnormalities.

5 Claims, 3 Drawing Sheets

PET FOOD COMPOSITION FOR LARGE BREED PUPPIES AND METHOD FOR PROMOTING PROPER SKELETAL GROWTH

BACKGROUND OF THE INVENTION

The present invention relates to a pet food composition for large or giant breed puppies, and more particularly, to such a pet food composition which contains restricted quantities of calcium and phosphorus which, when fed to the animals, promotes proper skeletal growth in growing large or giant breed puppies.

Large or giant breed puppies grow to a larger body size than smaller breed puppies, and as a result, they have a genetic propensity to grow very rapidly when provided with a nutrient-rich diet. However, it has been found that such rapid growth can result in an imbalance between the rate of body weight gain and skeletal growth of the puppies. In addition, the bones of large and giant breed dogs are less dense than bones of smaller breed dogs. Accordingly, large or giant breed puppies are often susceptible to skeletal growth abnormalities including disturbances in endochondral ossification which may lead to osteochondrosis, hypertrophic osteodystrophy, and hip dysplasia.

As a result, extensive research has been done in recent years with regard to the nutritional management of large breed puppy diets in an effort to lessen the incidence and severity of skeletal disease in growing large or giant breed puppies. A number of studies have been conducted with regard to the relationship between nutrition and bone growth in puppies including the influence of high energy (high fat) diets, and the influence of protein, calcium, and phosphorus levels in the diet. With regard to energy intake, studies have indicated that ad libitum feeding of large breed dogs with a diet high in energy results in increased body weights which exceed skeletal growth rates, potentially leading to skeletal abnormalities. See Dämmrich, "Relationship Between Nutrition and Bone Growth in Large and Giant Dogs", *Am. Inst. of Nutrition*, pp. S114–S121 (1991).

Studies have also indicated that large breed puppy diets which are high in calcium have a negative impact on skeletal development. See Goedegebuure et al, "Morphological Findings in Young Dogs Chronically Fed a Diet Containing Excess Calcium", *Vet Pathol.*, 23:594–605(1986) and Hazewinkel, et al, "Influences of Chronic Calcium Excess on the Skeletal Development of Growing Great Danes, *J. Am. Animal Hosp. Assoc.*, Vol. 21, pp.377–391 (1985).

However, while these and other studies have indicated that high levels of certain minerals and other components in the diet can have an adverse affect on skeletal development of large breed puppies, no puppy diets have been developed which target the optimal nutrient density necessary to minimize the risk of skeletal abnormalities in growing large breed puppies.

Accordingly, there is still a need in the art for a pet food product formulated specifically for large and giant breed puppies which will provide the proper balance of nutrients to obtain optimum skeletal health of growing large and giant breed puppies.

SUMMARY OF THE INVENTION

The present invention meets that need by providing a pet food composition for large and giant breed puppies which contains restricted levels of calcium and phosphorous along with a balance of other nutrients to promote proper skeletal growth. The composition also contains lower levels of fat to reduce excessive growth rates which could have an adverse affect on skeletal development.

According to one aspect of the present invention, a pet food composition for large or giant breed puppies is provided. By large or giant breed puppies, it is meant breeds which reach a mature body weight of 65 lbs. (30 kg) or more. The pet food composition comprises from about 0.75 to 0.95% by weight calcium and from about 0.62% to 0.72% by weight phosphorus on a total weight basis. Preferably, the ratio of calcium to phosphorus is greater than about 1:1 and is preferably about 1.2:1 to 1.3:1. The composition further comprises a source of protein, a source of fiber, and a source of fat.

In a preferred embodiment of the invention, the pet food composition comprises about 0.86% by weight calcium, about 0.67% by weight phosphorus, from about 24% to 28% by weight protein, from about 12% to 16% by weight fat, from about 4% to 6% by weight fiber, from about 40% to 45% by weight carbohydrates, from about 0.45% to 0.65% by weight vitamins, from about 4% to 8% by weight minerals, and the balance water. When the pet food composition of the present invention is fed to large or giant breed puppies on a daily basis, it has been found to be effective in reducing the incidence of skeletal disease while providing adequate growth rates.

Accordingly, it is a feature of the present invention to provide a pet food composition for large and giant breed puppies which comprises an amount of calcium and phosphorus which, when fed in combination with other nutrients, provides optimum growth while effectively preventing skeletal abnormalities. This, and other features and advantages of the present invention will become apparent from the following detailed description and the appended claims.

DETAILED DESCRIPTION OF THE PREFERRED EMBODIMENTS

The pet food composition of the present invention may be provided in any suitable form as long as it contains the preferred concentrations of calcium and phosphorus. Preferably, the composition also includes reduced levels of fat content.

It has been discovered that by including lower amounts of calcium (about 0.75% to 0.95%) and phosphorus (0.62% to 0.72%) than that found in typical puppy diets (about 1.2% calcium and 1.0% phosphorous), the skeletal health of the growing large breed puppies is enhanced, particularly when provided in a diet having reduced energy density (lower fat content). The pet food composition of the present invention preferably comprises only about 14% by weight fat in comparison to typical puppy foods which contain about 20–21% fat. In addition, the pet food composition of the present invention preferably comprises about 26% protein which maintains an appropriate ratio of protein to energy in the diet.

Suitable sources of calcium include calcium carbonate and dicalcium phosphate. A preferred source of phosphorus is dicalcium phosphate.

Suitable sources of protein for use in the pet food composition include, but are not limited to, chicken and chicken by-products, chicken digest, Brewers dried yeast, and DL-methionine. Suitable sources of fat include chicken fat (preserved with BHA), fish oil, and flax.

The pet food composition preferably further includes at least 2.44% omega-6 fatty acids and at least 0.49% omega-3 fatty acids.

The composition preferably includes about 5% by weight fiber. Suitable sources of fiber include dried beet pulp, gum arabic, gum talha (a form of gum arabic), psyllium, rice bran, carob bean gum, citrus pulp, pectin, fructooligosaccharides, mannanoligosaccharides, and mixtures thereof.

The pet food composition also preferably includes sources of carbohydrates which may include ground corn, rice flour, Brewer's rice, and ground grain sorghum.

The composition may also contain mixtures of vitamins and minerals including, but not limited to, zinc oxide, vitamin E, ascorbic acid, copper sulfate, manganese sulfate, biotin, manganous oxide, vitamin A acetate, calcium pantothenate, thiamine mononitrite, Vitamin $B_{12}$ supplement, niacin, riboflavin supplement, inositol, Vitamin $B_6$, potassium iodide, Vitamin $D_3$ supplement, folic acid, sodium selenite, and cobalt carbonate.

The composition preferably has a moisture content of about 10% which is provided in varying degrees by most of the ingredients.

In order that the invention may be more readily understood, reference is made to the following examples, which are intended to be illustrative of the invention, but are not intended to be limiting in scope.

EXAMPLE 1

Figure 1:
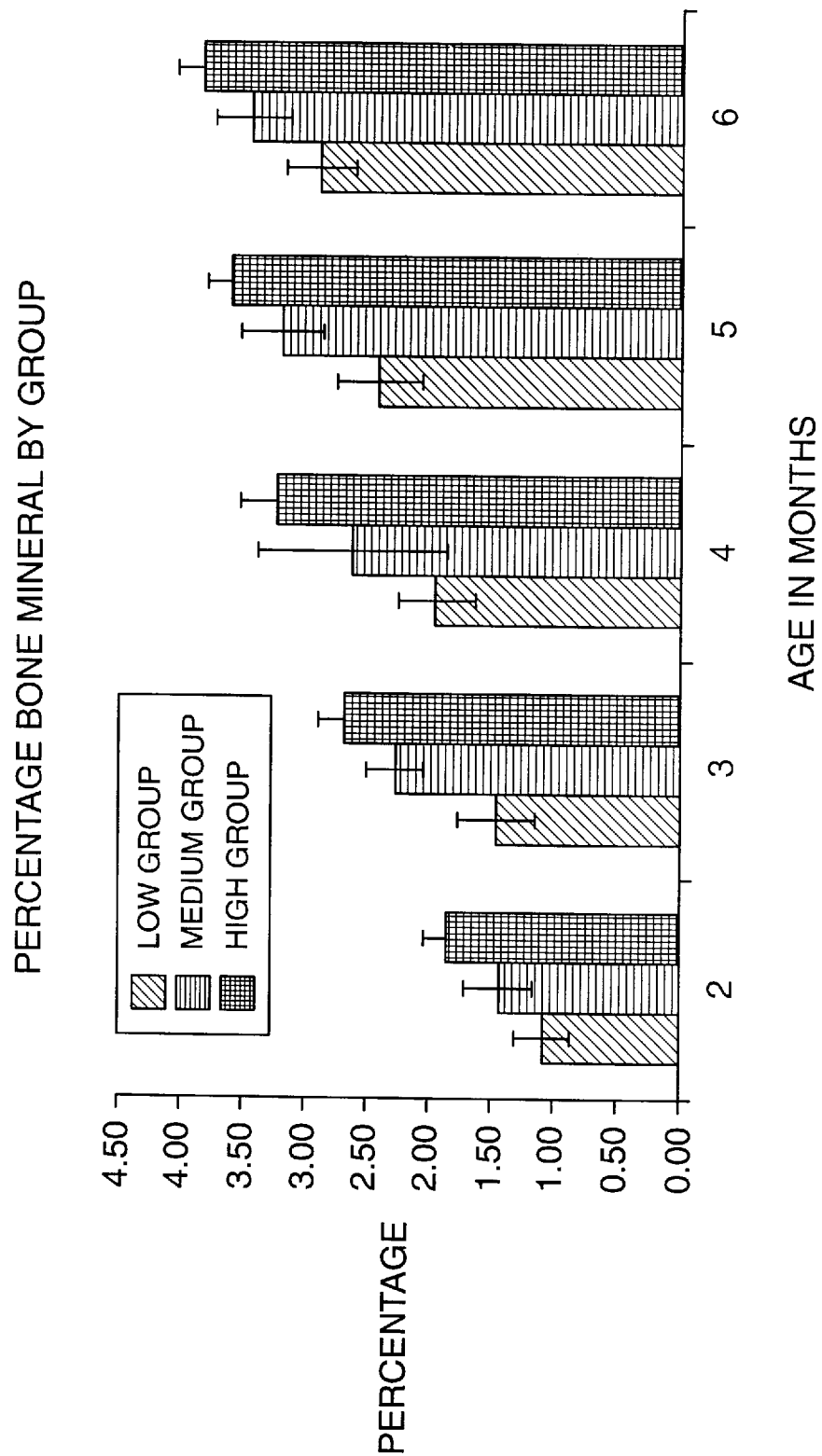
FIG. 1 is a chart which illustrates the bone mineral content measured in large breed puppies fed diets varying in calcium and phosphorus.
Figure 2:
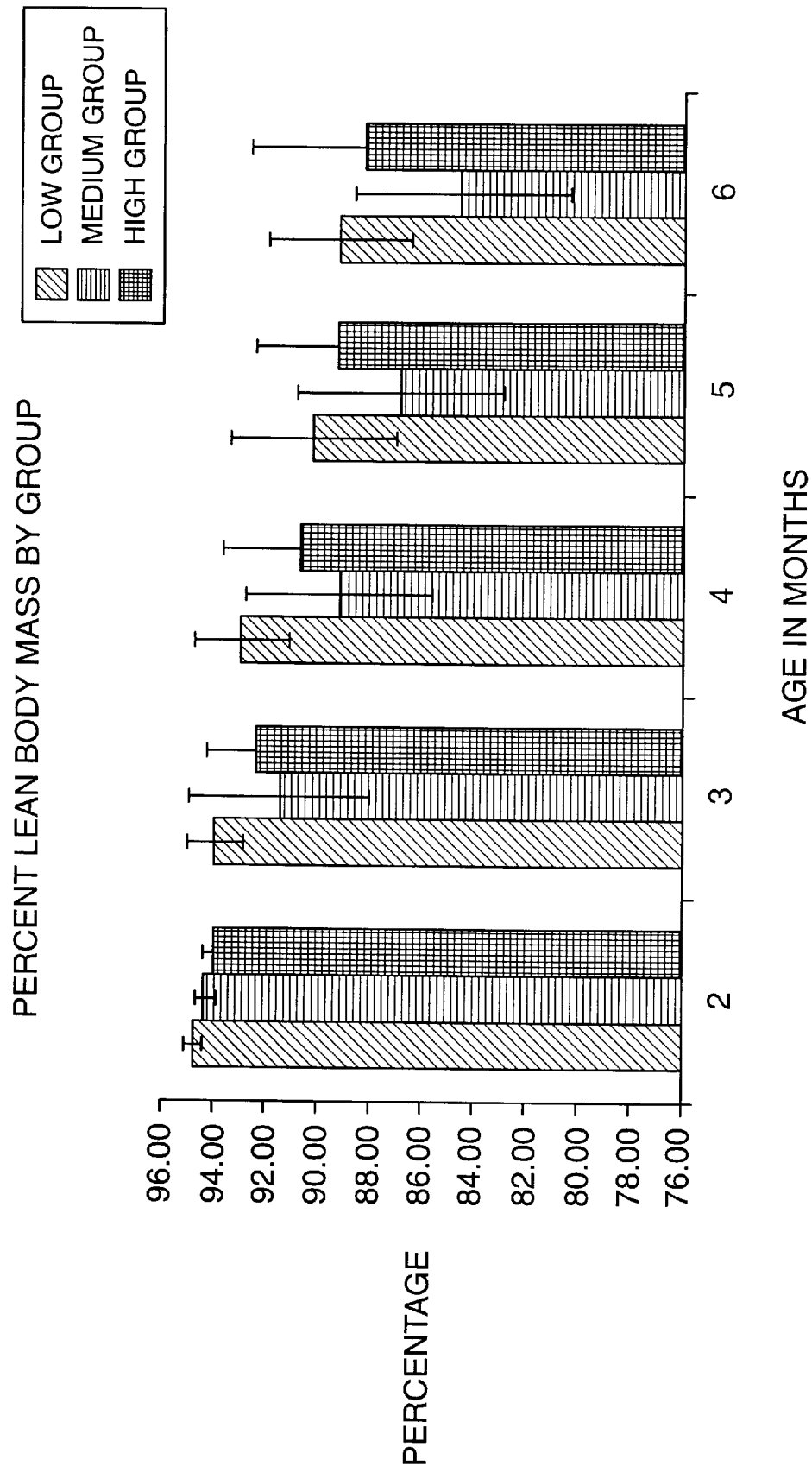
FIG. 2 is a chart which illustrates the lean body mass of the measured puppies.
Figure 3:
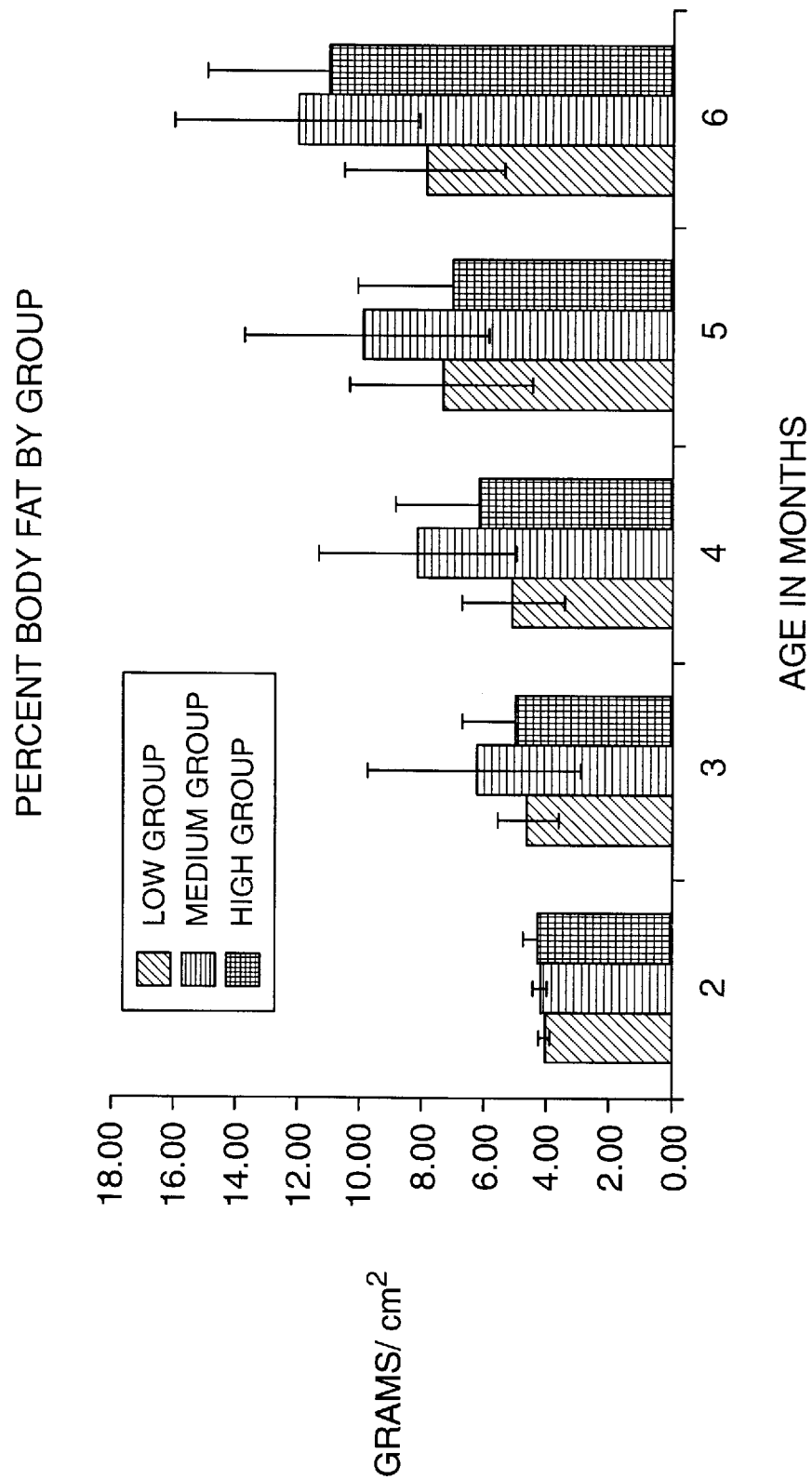
FIG. 3 is a chart which illustrates the body fat of the measured puppies.

To determine the effects of varying dietary concentrations of calcium and phosphorous on growth and development of large breed puppies, 39 Great Dane puppies from five litters were assigned randomly at five weeks of age to three isocaloric (14% fat) and isonitrogenous (26% protein) dietary groups varying in calcium and phosphorus concentrations (static Ca:P ratio) including low calcium (0.48% Ca, 0.40% P) (n=12), medium calcium (0.80% Ca, 0.67% P) (n=12), and high calcium (2.70% Ca, 2.20% P) (n=15). Nursing puppies were supplemented twice daily with assigned diets until weaned at 7 weeks, after which they were fed for 30 minutes twice daily. At 8 weeks, and monthly thereafter, puppies were evaluated by whole body dual energy x-ray absorptiometry (DEXA) using a Lunar DPX-L densitometer. Lean body mass, fat tissue, bone mineral content, and total body weight were measured. Differences in bone mineral content between dietary groups were marked at 8 weeks of age and continued to diverge. As shown in FIG. 1, bone mineral content as a percentage of body weight at 2 months was 1.07%±0.23 (low group) 1.42%±0.29 (medium group) and 1.85%±0.32 (high group), and by 6 months had increased to 2.91%±0.23, 3.45%±0.31, and 3.84%±0.24 respectively. At weaning, lean body mass and fat tissue were statistically equal in all dietary groups (see FIGS. 2 and 3), but became divergent by 4 months and continued to diverge through 1 year. Puppies fed the medium calcium diet had more fat tissue and less lean body mass as a percentage of total body weight. Effects of dietary calcium and phosphorus concentration are reflected rapidly in body composition assessed by the noninvasive DEXA method.

EXAMPLE 2

Thirty-nine Great Dane puppies were divided into three groups at weaning (4–5 weeks of age) and were fed isocaloric diets varying only in levels of calcium and phosphorus. The three diets were designated as low (0.48% Ca:0.40% P), medium (0.80% Ca:0.67% P), or high (2.70% Ca:2.20% P) based on the calcium and phosphorus content. The ratios of these minerals were consistent at 1.2:1.0 Ca:P. Puppies were allowed a thirty minute food consumption twice daily. Bone density was measured monthly by noninvasive Dual Energy X-ray Absorptiometry (DEXA) analysis. Radiographs were made at 2 month intervals of the cervical spine, right and left scapulohumeral joints, left antebrachium, left stifle, and hips. Orthopedic exams including length measurements of the humerus, radius/ulna, femur, and tibia/fibula were performed. Additional radiographs were made to verify cases of clinical lameness.

The results shown below in Tables 1, 2 and 3 indicate that dogs fed the medium and high mineral diets gained body weight and achieved a higher bone density more rapidly than dogs fed the low mineral diets. Preliminary results of the first 6 months revealed no difference in bone lengths between feed groups. Dogs fed the low mineral diet were not compromised in height as shown in Table 2, however it was noted that they consistently demonstrated lower total body weight. Within the first 6 months, dogs fed the high mineral diet experienced increased incidence of clinically apparent orthopedic abnormalities expressed either as exaggerated lameness or abnormal mandibular osseous proliferation.

TABLE 1

Body Weight (kg) as Affected by Dietary Calcium and Phosphorus Concentration

| Treatment | Age (Months) | | | |
|---|---|---|---|---|
| | 1 | 2 | 3 | 4 |
| Low (n = 12) | 2.10 | 5.30 | 13.5 | 27.0 |
| Med. (n = 12) | 2.15 | 6.90 | 20.3 | 34.0 |
| High (n = 15) | 2.11 | 7.70 | 19.5 | 29.9 |

TABLE 2

Shoulder Height (cm) as Affected by Dietary Calcium and Phosphorus Concentration

| Treatment | Age (Months) | | |
|---|---|---|---|
| | 2 | 4 | 6 |
| Low (n = 12) | 23.7 | 36.4 | 48.7 |
| Med. (n = 12) | 21.7 | 42.6 | 49.9 |
| High (n = 15) | 23.5 | 40.0 | 48.0 |

TABLE 3

Bone Mineral Density (gm/cm$^2$) as Affected by Dietary Calcium and Phosphorus Concentration

| Treatment | Age (Months) | | |
|---|---|---|---|
| | 2 | 4 | 6 |
| Low (n = 12) | 0.442 | 0.521 | 0.703 |
| Med. (n = 12) | 0.456 | 0.637 | 0.820 |
| High (n = 15) | 0.488 | 0.677 | 0.846 |

The results indicate that the high mineral diet has a negative effect on conformation and orthopedic soundness, while the lower mineral diet results in decreased bone density and lower body weights. Accordingly, the medium mineral diet appears to be the most effective for meeting the mineral requirements of the puppies without inducing orthopedic defects.

EXAMPLE 3

Thirty-nine Great Dane puppies from 5 litters were studied from 2 through 12 months of age. The puppies were divided into three groups and fed diets identical in protein and fat (27% and 14% respectively), but differing in calcium and phosphorus. The three diets were designated as low (0.48% Ca:0.40% P) (n=12), medium (0.80% Ca:0.67% P) (n=12), or high (2.70% Ca:2.20% P) (n=15). Nursing puppies were supplemented with specific diets as they began to wean at 5–6 weeks. Puppies were similar in body weight at weaning, but over time, the medium diet puppies gained more body weight than the low and high diet puppies as shown in Tables 4 and 5 below, which illustrate the body composition of the puppies at 8 weeks and 12 months.

TABLE 4

Measurement of Body Composition at 8 weeks

|  | Body Weight (kg) | Bone Mineral Density (g/cm$^2$) | Percent Lean Body Mass |
| --- | --- | --- | --- |
| Low Diet | 5.35 ± 1.54 | 0.4421 ± .0074 | 94.88 ± 0.35 |
| Med. Diet | 6.97 ± 0.98 | 0.4555 ± .0174 | 94.46 ± 0.40 |
| High Diet | 7.70 ± 1.66 | 0.4819 ± .0276 | 93.99 ± 0.55 |

TABLE 5

Measurement of Body Composition at 12 months

|  | Body Weight (kg) | Bone Mineral Density (g/cm$^2$) | Percent Lean Body Mass |
| --- | --- | --- | --- |
| Low Diet | 44.14 ± 3.77 | 0.9756 ± .0766 | 84.54 ± 4.18 |
| Med. Diet | 50.79 ± 6.82 | 1.0460 ± .0648 | 80.33 ± 4.04 |
| High Diet | 45.82 ± 6.17 | 1.0528 ± .0725 | 87.60 ± 2.79 |

Although the lean tissue composition of all puppies was nearly identical at weaning, at 12 months, the medium group shows a different fat/lean distribution than that of the low and high diet puppies.

Supplementation of puppies with test diets prior to weaning was reflected in the bone mineral density of the groups at the first test point. By 12 months of age, the medium and high groups had similar bone densities, while the low diet group maintained a lower bone mineral density.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A pet food composition for large breed puppies comprising from about 0.75% to 0.95% by weight calcium and from about 0.62% to 0.72% by weight phosphorus on a total weight basis, said composition further comprising a source of protein, a source of fiber, and a source of fat.

2. The pet food composition of claim 1 in which the ratio of calcium to phosphorus is from about 1.2:1 to 1:3:1.

3. The pet food composition of claim 1 comprising about 0.86% by weight calcium, about 0.67% by weight phosphorous, about 24% to 28% by weight protein, about 12% to 16% by weight fat, and about 4% to 6% by weight fiber.

4. A method of promoting proper skeletal growth in a large breed puppy comprising the step of feeding said puppy a pet food composition comprising from about 0.75% to 0.95% by weight of calcium and from about 0.62% to 0.72% by weight phosphorus, said composition further comprising a source of protein, a source of fiber, and a source of fat.

5. The method of claim 4 in which said pet food composition comprises about 0.86% by weight calcium, about 0.67% by weight phosphorous, about 24% to 28% by weight protein, about 12% to 16% by weight fat, and about 4% to 6% by weight fiber.

* * * * *